United States Patent [19]

Margolus et al.

[11] Patent Number: 5,159,690

[45] Date of Patent: Oct. 27, 1992

[54] MULTIDIMENSIONAL CELLULAR DATA ARRAY PROCESSING SYSTEM WHICH SEPARATELY PERMUTES STORED DATA ELEMENTS AND APPLIES TRANSFORMATION RULES TO PERMUTED ELEMENTS

[75] Inventors: Norman H. Margolus, Somerville; Tommaso Toffoli, Cambridge, both of Mass.

[73] Assignee: Massachusetts Institute of Technology, Cambridge, Mass.

[21] Appl. No.: 252,391

[22] Filed: Sep. 30, 1988

[51] Int. Cl.$^5$ ............................................. G06F 15/31
[52] U.S. Cl. .................................. 395/800; 364/259.8; 364/221.2; 364/232.3; 364/256.4; 364/DIG. 1
[58] Field of Search ... 364/200 MS File, 900 MS File; 395/800

[56] References Cited

U.S. PATENT DOCUMENTS

| | | | |
|---|---|---|---|
| 4,380,046 | 4/1983 | Fung | 364/200 |
| 4,449,201 | 5/1984 | Clark | 364/900 |
| 4,513,374 | 4/1985 | Hooks | 364/200 |
| 4,601,055 | 7/1986 | Kent | 364/900 |
| 4,602,347 | 7/1986 | Koyama | 364/200 |
| 4,707,859 | 11/1987 | Nudd | 382/50 |
| 4,769,644 | 9/1988 | Frazier | 382/50 |
| 4,769,664 | 9/1988 | Frazier | 382/50 |
| 4,773,038 | 9/1988 | Hillis | 364/900 |
| 4,805,091 | 2/1989 | Thiel | 364/200 |
| 4,805,228 | 2/1989 | Jenkins | 382/49 |
| 4,806,248 | 8/1989 | Lumelsky | 364/900 |
| 4,809,202 | 2/1989 | Wolfram | 364/200 |
| 4,814,973 | 3/1989 | Hillis | 364/200 |
| 4,827,432 | 5/1989 | Kasano | 382/41 |
| 4,831,519 | 5/1989 | Morton | 364/200 |
| 4,858,110 | 8/1989 | Miyata | 364/200 |
| 4,860,236 | 8/1989 | McLeod | 364/717 |
| 4,862,347 | 8/1989 | Rudy | 364/200 |
| 4,882,683 | 11/1989 | Rupp | 340/723 |
| 4,905,143 | 2/1990 | Takahashi | 364/200 |
| 4,983,958 | 1/1991 | Carrlick | 364/200 |

OTHER PUBLICATIONS

Toffoli, Tommaso et al., "Programmable Matter: Concepts and Realization" Jan. 31, 1990, pp. 1–10, to appear in *Physica D* 666 (1990) 1-O, North Holland, Amsterdam.

Margolus, Norman et al., "Cellular-Automata Supercomputers for Fluid-Dynamics Modeling" *Physical Review Letters*, vol. 56:16, pp. 1694–1696, Apr. 21, 1986.

Toffoli, Tommaso, "Cellular Automata as an Alternative to (Rather Than an Approximation of) Differential Equations in Modeling Physics" Physica 10D pp. 117–127, (1984).

Toffoli, T. and Margolus, N., "A New Environment for Modeling", Cellular Automata Machines (1987), pp. 165–167 and pp. 243–247.

Toffoli, T. and Margolus, N., "The CAM-7 Multiprocessor: A Cellular Automata Machine", Laboratory for Computer Science (1985).

Toffoli, T. and Margolus, N., "Cellular Automata Machines", *Complex Systems*, vol. 1, No. 5 (1987), pp. 967–993.

(List continued on next page.)

*Primary Examiner*—Thomas C. Lee
*Assistant Examiner*—Eric Coleman
*Attorney, Agent, or Firm*—Fish & Richardson

[57] ABSTRACT

A method for coordinating the activity of a plurality of processors in a computing architecture adapted to emulate a physical space, in which spatial locality is reflected in memory organization, including the steps of subdividing the emulated physical space, assigning memory to each subdivision, and assigning a processor to each assigned memory, respectively. A related data array computer for performing an iterative updating operation upon data bits, including a first circuit for performing data-blind data movement upon the data bits, the circuit being scalable, and a second circuit for performing an arbitrary update function upon at least some of the data bits. The architecture is adapted to readily implement cellular automata.

27 Claims, 9 Drawing Sheets

OTHER PUBLICATIONS

Toffoli, T., "CAM: A High-Performance Cellular-Automaton Machine", *Physica*, vol. 10D (1984), pp. 195-204.

Kugelmass, S., Squier R., and Steiglitz, K., "Performance of VLSI Engines for Lattice Computations", *Complex Systems*, vol. 1 (1987), pp. 939-965.

Clouquer, A. and d'Humieres, D., "RAP1, a Cellular Automaton Machine for Fluid Dynamics", *Complex Systems*, vol. 1 (1987), pp. 585-597.

Hasslacher, Brosl "Discrete Fluids" *Los Alamos Science*, Special Issue, pp. 175-217, (1987).

Frisch, Uriel et al., "Lattice Gas Hydrodynamics in Two and Three Dimensions" Complex Systems 1, pp. 649-707, (1987).

Hayes, Brian "Computer Recreations" *Scientific American* vol. 250:3, pp. 12-21, Mar. 1984.

Margolus, Norman et al., "Cellular Automata Machines" in *Lattice Gas Methods for Partial Differential Equations*, Eds. Doolen et al., pp. 219-249, (1990).

Margolus, Norman et al., "Cellular Automata Machines" *Complex Systems* 1, pp. 967-993, (1987).

Despain, A. et al., "Prospects for a Lattice-Gas Computer" in *Lattice Gas Methods for Partial Differential Equations*, Eds. Doolen et al., pp. 211-218, (1990).

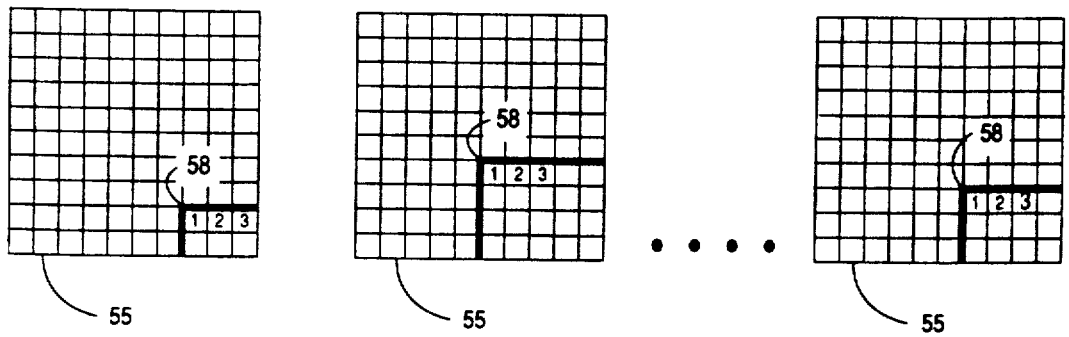
FIG. 6
FIG. 7
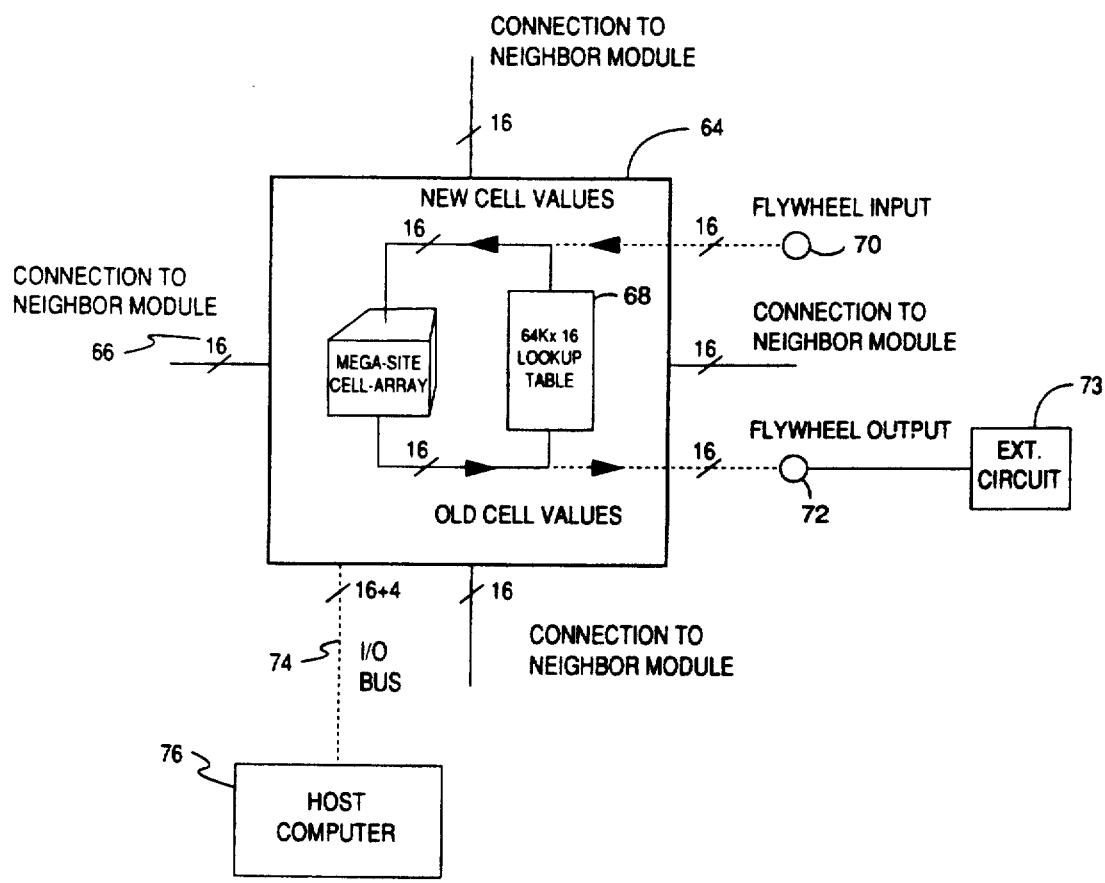

MULTIDIMENSIONAL CELLULAR DATA ARRAY PROCESSING SYSTEM WHICH SEPARATELY PERMUTES STORED DATA ELEMENTS AND APPLIES TRANSFORMATION RULES TO PERMUTED ELEMENTS

BACKGROUND OF THE INVENTION

The U.S. Government has non-exclusive rights in this invention pursuant to contract number N00014-84-K-0099 awarded by DARPA.

This invention relates to a method and apparatus utilizing spatial locality for data gathering in a scalable array of communicating processors, such as would be used to implement cellular automata (CA).

A basic cellular automaton consists of a uniform array of cells, each containing state information. Each cell communicates only with its neighboring cells. Time passes in discrete steps as measured by an imaginary clock. At any time t, each cell of a CA is in one of a finite number of states. For example, there may only be two states: on or off. In step with the clock, the state of each cell is updated using rules based on local information only, i.e., the current state of the cell and its neighboring cells. At time t+1, the cells in the array are updated simultaneously, using the same rules to update each cell. An initial arrangement of cell states will evolve with time.

Partitioning cellular automata (PCA) represent a distinct class of CA. In a PCA, the array of cells is partitioned into a collection of finite, non-overlapping and uniformly arranged groups of cells called blocks. Each time-step t, a block rule looks at all the cells in each block and updates each block as a group, as opposed to looking at each cell and updating it separately. The same rule is applied to each block.

The partitioning of cells into blocks is changed from one time-step to the next, so that some overlap exists between the partition used in a time-step t and a later time step t+1. If the same partition were used at every step, the CA would be effectively subdivided into a collection of independent subsystems.

As in the basic CA discussed above, an initial array of cell states will evolve in accordance with an update rule with each time-step.

Although a traditional serial computer can simulate the behavior of a cellular automaton, the most natural architecture to use would be a fully parallel array of simple processors—one processor for each cell. A cellular automata machine (CAM) is a highly parallel computer adapted to implement CA efficiently. Using a highly parallel architecture yields a performance improvement over a serial implementation of several orders of magnitude, at comparable cost.

SUMMARY OF THE INVENTION

It is one aspect of the present invention to coordinate the activity of a plurality of processors in a computing architecture adapted to emulate a physical space in which spatial locality is reflected in memory organization, by subdividing the emulated space, assigning memory to each subdivision, and assigning a processor to each assigned memory.

It is one feature of the invention that the assigned memory may be divided into a finite number of elements, and, from time to time, the elements of each memory are respectively updated by being replaced with a new set of elements in a sequential fashion by a respective processor assigned to the memory.

It is another feature of the invention that the updating includes scanning the content of each memory so as to access data to be used in updating.

It is another feature of the invention to provide each element of each memory with a finite number of components such that the memories are accessible to form sets of corresponding components, each set being scanned independently and all sets respectively being scanned simultaneously.

It is another feature of the invention to perform updating of a memory assigned to a given processor based upon information in that respective memory and upon information in each respective memory assigned to a plurality of neighboring processors.

It is another feature of the invention to associate the structure of an N-dimensional array with the memory elements, wherein a set of memory elements is updated in a step, wherein corresponding components of the memory elements form subarrays, and wherein the scan in a step is such that subarrays are independently shifted as a group relative to each other.

It is another feature of the invention to organize the memories and associated processors as an array. The array may be multidimensional.

It is another feature of the invention to divide an array to be updated into a plurality of equal regions, wherein a respective region is associated with a respective memory, wherein some memory element components, in being shifted as a group, are moved from one region to another, and wherein data which is moving into a region associated with a given processor is combined with the data being scanned in the associated memory to produce an input to be used in said updating.

It is another feature of the invention to identify corresponding element between memories and scanning such that corresponding components of corresponding elements are scanned simultaneously.

It is another feature of the invention to apply a rule for achieving global movement of components as subarrays of a single N-dimensional array by applying the restriction that at the moment when a processor requires a component as input which physically resides in a region of the N-dimensional array associated with a neighboring processor, the scan of each processor accesses the corresponding component which is passed to an adjacent processor where it is substituted for the value that that processor scanned itself as an input to the updating process.

It is another feature of the invention to permit the memory elements within a given memory to be updated in an arbitrary order by rearranging the scan to create the order.

It is another feature of the invention to utilize the predictability and sequential nature of access to each memory to allow a multistep updating function in a pipelined parallel fashion to avoid slowing down the access.

It is another aspect of the present invention that a data array computer for performing an iterative updating operation upon data bits includes a first circuit for performing data-blind data movement upon the data bits, the circuit being scalable, and a second circuit for performing an arbitrary update function upon at least some of the data bits.

It is one feature of the invention that the first circuit includes an N-dimensional array of memories, where a given memory is connected only to neighboring memories.

It is another feature of the invention that each memory has a given processor associated with it to perform the function of the second circuit.

It is another feature of the invention that each memory includes an M-dimensional array of cells, and the first circuit is adapted to partition the data bits into disjoint groupings which reside in respective cells after updating.

It is another feature of the invention that the second circuit is adapted to update the disjoint groupings such that the update function alternates with the data movement.

It is another feature of the invention that the second circuit is adapted to update an array of disjoint groupings.

It is another feature of the invention that each memory is adapted to store a lattice of bits that lie on a series of K bit-slices.

It is another feature of the invention that the Kth bit of each grouping is selected from the Kth bit slice.

It is another feature of the invention that the memories are coupled to intercommunicate such that the partitioning into disjoint groupings results in uniform displacement of all bits on a given bit slice relative to the M-dimensional array.

It is another feature of the invention that the second circuit may include a lookup table.

It is another feature of the invention that the second circuit may include a floating point processor.

It is another feature of the invention that the second circuit may be pipelined.

It is another feature of the invention that the second circuit includes at least one SRAM.

It is another feature of the invention that the first circuit includes a DRAM and a controller for the DRAM.

It is another feature of the invention that the controller controls memory access and processor activity.

In another aspect of the present invention, the evolution of a finite, uniformly interconnected, N-dimensional array of multi-component data-cells is determined, where i denotes an arbitrary array site, and each cell $C_i$ includes J distinct components $C_{ij}$ of data, where j denotes a component class $j = 1, \ldots, J$, including the steps of: (a) permuting the components $C_{ij}$ among the data-cells within each component class j using a permutation $P_j$; and (b) performing an update function F on each of the data-cells at a time-step t to yield a new state of the array at a later time-step $t+1$.

It is a feature of the invention that the update function F is applied sequentially to each of the data cells.

It is another feature of the invention that permutation $P_j$ is an arbitrary offset $x_j$ applied to each component $C_{ij}$ of a component class j which allows data at a site $i+x_j$ to be updated as if it resided at a site i.

It is another feature of the invention that the components of data $C_{ij}$ are binary numbers It is another feature of the invention that the components of data $C_{ij}$ are floating point numbers.

It is another feature of the invention that the components of data are matrices of complex numbers.

It is another feature of the invention that the permutation $P_j$ may change with at least one time-step t.

It is another feature of the invention that the update function F may change with at least one time-step t It is another feature of the invention to include the step of combining an arbitrary number of the arrays to form a combined array, wherein the components $C_{ij}$ from each of the arrays are permuted as a whole among the data-cell $C_i$ over all the arrays within each component class j using a permutation $P_j$, and an update function F is performed on each of the data-cells $C_i$ at a time-step t to yield a new state of the array at a later time-step $t+1$.

It is another feature of the invention to include the step of combining an arbitrary number of arrays to form a combined array, wherein all the components $C_{ij}$ in the component class j of each array are collected together, permuted as a whole as in step (a), and then updated as a whole in step (b).

It is another feature of the invention that the separate portions of the combined array are permuted and updated by separate processors, wherein each processor sequentially scans its associated array in lockstep with all other processors so that homologous sites of each of the separate portions are updated in parallel using update function F.

Other advantages and features will become apparent from the following description of the preferred embodiment and from the claims.

DESCRIPTION OF THE PREFERRED EMBODIMENT

We first briefly describe the drawings.

FIG. 6 is a representation of a series of different scan window positions.

FIG. 7 is a block diagram of a single module.

FIG. 9b is a block diagram of a bit-module within the module of FIG. 9a.

We have designed a computing architecture which maps to space, in which space is subdivided, a portion of memory is assigned to each subdivision, and a processor is assigned to each portion of memory. Our architecture is adapted to readily implement a CA.

In the present invention, the evolution of a finite, uniformly interconnected, N-dimensional array of multi-component data-cells is determined, where i denotes an arbitrary array site, and each cell $C_i$ includes J distinct components $C_{ij}$ of data, where j denotes a component class $j = 1, \ldots, J$. This determination includes the steps of: (a) permuting the components $C_{ij}$ among the data-cells within each component class j using a permutation $P_j$; and (b) performing an update function F on each of the data-cells at a time-step t to yield a new state of the array at a later time-step t+1.

The update function F is preferably applied sequentially to each of the data-cells. The permutation $P_j$ is an arbitrary offset $x_j$ applied to each component $C_{ij}$ of a component class j which allows data at a site $i + x_j$ to be updated as if it resided at a site i. Optionally, permutation $P_j$ changes with at least one time-step t and the update function F changes with at least one time-step t. The components of data $C_{ij}$ may be binary numbers or floating point numbers. The components of data may be matrices of complex numbers.

In practice of the invention it is preferable to combine an arbitrary number of the arrays described above to form a combined array, wherein the components $C_{ij}$ from each of the arrays are permuted as a whole among the data-cell $C_i$ over all the arrays within each component class j using a permutation $P_j$, and an update function F is performed on each of the data-cells $C_i$ at a time-step t to yield a new state of the combined array at a later time-step t+1. In the combined arrays all the components $C_{ij}$ in the component class j of each array are collected together, permuted as a whole as in step (a), and then updated as a whole in step (b). Separate portions of the combined array are permuted and updated by separate processors, wherein each processor sequentially scans its associated array in lockstep with all other processors so that homologous sites of each of the separate portions are updated in parallel using update function F.

The present invention will be further appreciated by way of the following discussion. To begin with, it is known that the data-cells of a CA can be interconnected in many ways. The cells might be arranged as a square planar array, with connections to nearest neighbors to the north, south, east, and west. Or, the cells might be arranged as a cubic array in three dimensions with six nearest neighbors, for example.

Figure 1A:
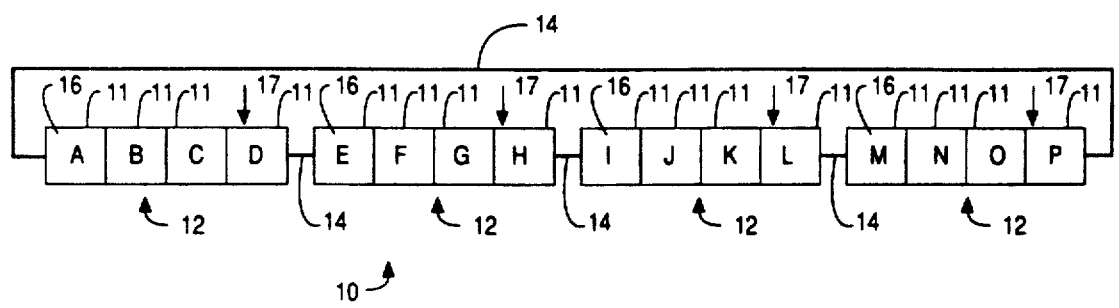
FIG. 1a is a representation of a one-dimensional 16-cell space divided evenly among four connected modules.

FIG. 1a shows a one dimensional 16-cell space 10, where each cell 11 contains stored information, here arbitrarily referred to as and represented by a letter. The cells are divided evenly among four modules 12. Each module is connected to its two nearest neighbors by two wires 14, respectively. The leftmost module is connected to the rightmost module so that they can communicate as nearest neighbors.

Our goal in the current example is to shift each letter three positions to the left, across modules and with global wraparound, i.e., the three leftmost letters in the space must be shifted into the three rightmost positions in the 16-cell space, respectively.

We can also shift by zero, one, two, or four positions, and shifting may be to the right as well as to the left. Thus, there are nine (2n+1) possible shifts in a one-dimensional module with four (n) cells Our method of shifting allows the modules to be joined together to form a larger, effectively continuous cell space.

To perform the shift of the example, in each module 12, pointer 17, initially pointing to a left-most cell 16, is adjusted to start a scan at the fourth cell from the left. Pointer 17 scans the cells from left to right with wraparound, i.e., after the rightmost cell of that module has been scanned, the pointer 17 continues scanning at the leftmost cell of that module. The pointer 17 represents the current memory address being read. Since the shift involves only pointer movement, as contrasted with the actual movement of data, we call this a "virtual shift".

A controller within each module executes a scan, in part by clocking the pointer sequentially through the cells of the module. The unique sequence of cells that the pointer 17 scans without retracing its path is termed a "scan window." A scan window includes the first cell scanned by the pointer 17, and all subsequent cells encountered by the pointer 17, up to but not including the first cell scanned.

Figure 1B:
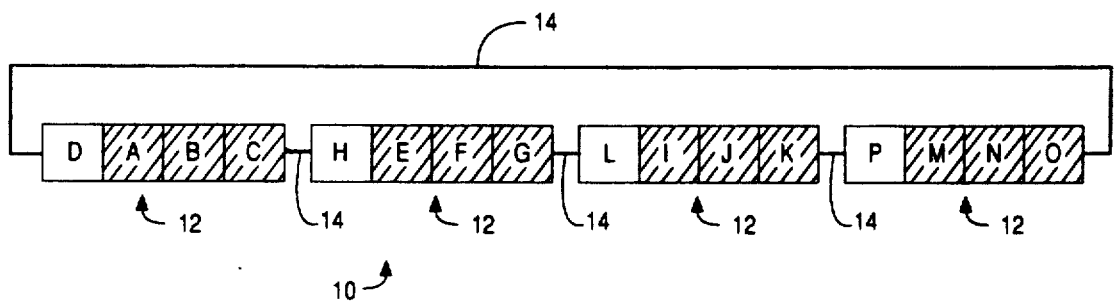
FIG. 1b is a representation of the scan windows of the modules with their cell data shifted and wrapped around locally.

At each cell along the scan, the controller executes a read-modify-write cycle. In the simplest example, the cell data are not modified. FIG. 1b shows the resulting scan window for each four-cell module 12 of FIG. 1a, where the scan began at the location indicated by the pointer 17 and terminated after four cells were scanned. Note that the letters appear shifted three positions to the left with local wraparound, i.e., the three leftmost letters of each module appear to have been shifted respectively into the three rightmost positions of each module To achieve the correct global shift with global wraparound, the modules must communicate with each other. In FIG. 1b, the shaded letters are in the correct position in each module assuming a local wraparound scheme, but are in the wrong module if we assume a global scheme. Since scanning proceeds toward the right, the three letters that have been wrapped around within each module (indicated by shading) must be moved into the left neighbor of each respective module to achieve a global shift. This is accomplished using "data source multiplexinq", as explained below.

Figure 1C:
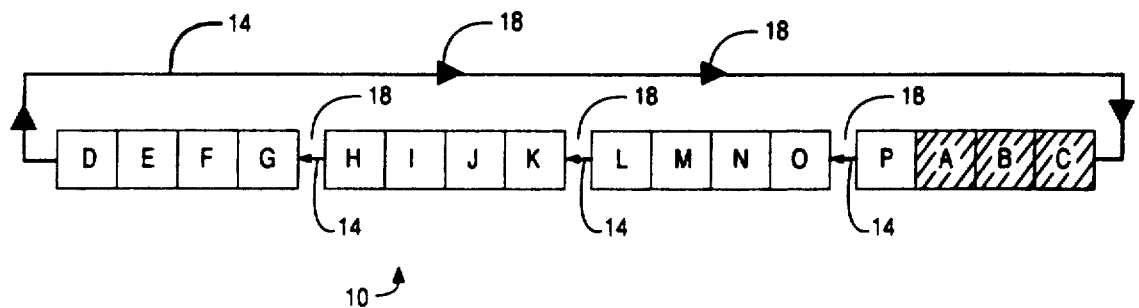
FIG. 1c is a representation of the scan windows of the modules with their cell data shifted and wrapped around globally.

FIG. 1c shows the coordinated scan windows of all the modules 12 in the cell space 10 with their letters in the correct, globally shifted and wrapped-around positions. The globally shifted and wrapped letters are indicated by shading in FIG. 1c. The wires 14 that interconnect the modules are used to transfer the letters between modules. The arrows 18 indicate the direction of inter-module data transfer.

Each module scans its data one cell at a time, executing a read modify write operation at each cell. When a first module scans a letter that belongs in a second module to its left (indicated by shading in FIG. 1b), the first module s data source multiplexer obtains the correct letter from a third module to its right using a connecting wire 14 at the instant the third module is scanning the letter needed by the first module.

The module's data source multiplexer has three input wires: one from the left neighbor, one from the right neighbor, and one from the module's own memory. The multiplexer decides which wire to access based on previously stored instructions from a host computer. The letter obtained via the chosen wire is written back to memory, correctly completing the shift.

Because the scanning of the modules is synchronized, data that one module needs is made available by its neighboring module at the exact moment the data is needed. Thus, there is no slowdown or buffering overhead involved in coordinating the communication activities of the various modules.

Figure 2:
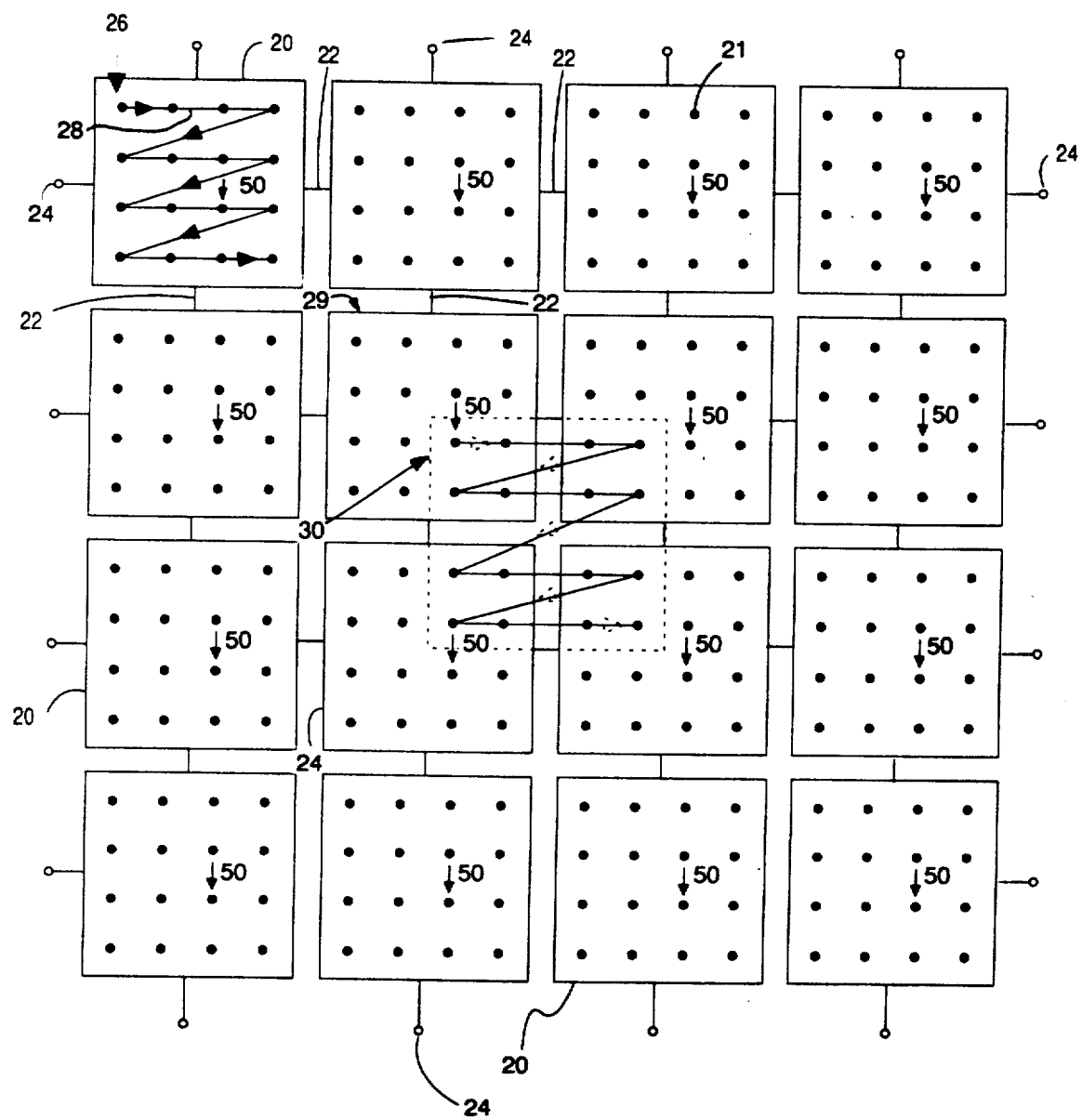
FIG. 2 is a representation of a two-dimensional 256-cell space divided evenly among sixteen connected modules.

We now consider a two-dimensional cell-space. Referring to FIG. 2, each of sixteen modules 20 includes a 4×4 array of cells 21. Analogous to the one-dimensional example above, each module is connected to its nearest neighbor to the right, left, top, and bottom with respective wires 22. Respective modules on opposite sides of the cell space are also connected by respective wires 24 so that they can communicate as nearest neighbors to facilitate global wraparound.

As before, virtual shifts are accomplished by first setting a pointer 26 to a given cell location, e.g. to cell 50, in the two-dimensional space of the module. The pointer represents the upper left corner of a rectangular virtual scan window 30. The virtual scan window 30 has the same size and shape as a module 20, but is offset by a distance defined by the starting position of the pointer 26. There is one virtual scan window for each module, each identically offset. In FIG. 2 scan window 30 is associated with module 29. In FIG. 2, scan window 30 is associated with module 29.

The virtual scan window 30 crosses module boundaries, so intermodule communication is necessary. In particular, the data source multiplexers in each module need to talk to the data source multiplexers in each of its four nearest neighbors.

Figure 3:
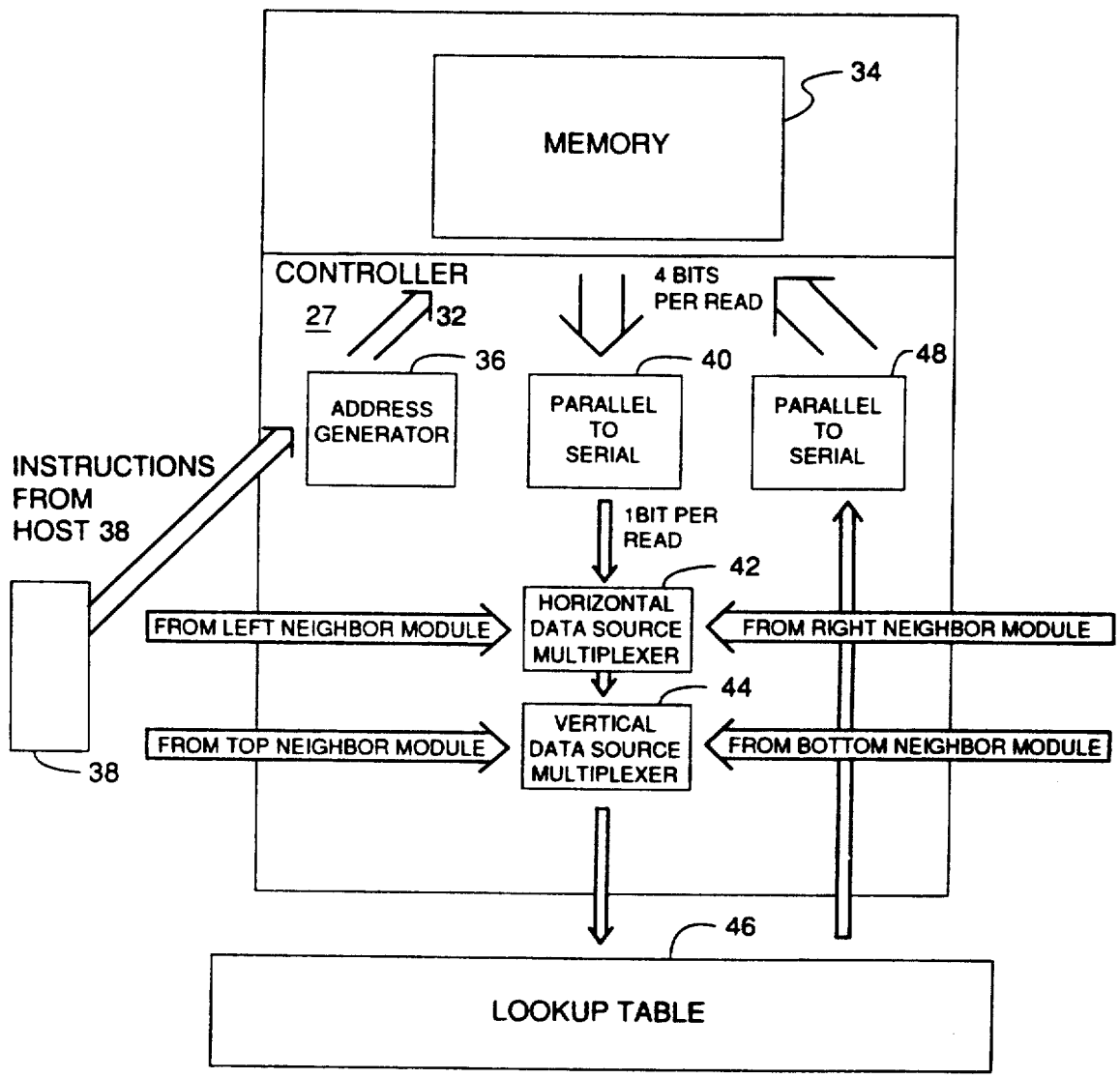
FIG. 3 is a block diagram of a controller, its associated memory chip, and a master lookup table.

In two dimensions, each controller 27 has two data source multiplexers. A single controller 27 associated with the memory 34 is shown in FIG. 3. Memory addresses 32 are sent to a memory 34 by an address generator 36 according to a scan pattern set up by the host computer 38. The memory 34 is read four bits per read operation. A parallel-to-serial converter 40 receives four bits and delivers a sequence of single bits to a horizontal data source multiplexer 42.

The horizontal multiplexer 42 of a given controller 27 has three input wires: one from the left neighbor, one from the right neighbor, and one from the parallel-to-serial converter 40 of the given controller 27. Each multiplexer has a counter (not shown) that is set by the host 38. The counter controls which wires will be selected at different moments for use as output to a vertical data source multiplexer 44.

The vertical data source multiplexer 44 has three input wires: one from the top neighbor, one from the bottom neighbor, and one from the horizontal data source multiplexer 42. The output of the vertical multiplexer 44 is sent to a lookup table 46. In our simple single bit cell example of FIG. 2, the output of the lookup table 46 is the same as its input. A serial-to-parallel converter 48 receives a bit sequence from this lookup table 46 and writes four bit nibbles back to the memory 34, completing a read-modify-write cycle.

The following example illustrates in detail for single-bit cells how a shift two cells up and two cells to the left is performed, with all modules executing the same instructions at the same time:

Referring to FIG. 2, the pointer 50 is placed on the third cell from the left in the third row from the top of each module. Thus, every virtual scan window 30 (only one is shown in FIG. 2) extends into the right nearest neighbor, the bottom nearest neighbor, and the right nearest neighbor of the bottom nearest neighbor.

The pointer 50 traces a virtual raster pattern within the boundary of the virtual scan window 30. At each cell 21, the controller 27 of the module dedicated to that cell 21 executes a read-modify-write cycle. The data is read from memory as four bit nibbles. The nibbles are then serialized and passed to the horizontal data source multiplexer 42 within the controller 27.

At the first and second cells of the first row along the virtual scan, both the horizontal and vertical data source multiplexers select the data stream that originated in the module's own memory. Since the required cell data exists within the module that is executing the scan, no intermodule communication is needed.

To access the data in the third and fourth cells of the first row of the virtual scan, we must use data scanned by the module of a right nearest neighbor. As these cells are being scanned, the horizontal data source multiplexer 42 in each module acts upon instructions sent earlier by the host 38, and selects the data stream that originates in the horizontal data source multiplexer 42 of a right neighboring module.

To obtain a virtual scan in the form of a raster pattern, each module must scan each row beginning with its third cell, and wrap around within the same row, finishing with the second cell before moving to the next row.

The second row of the virtual scan proceeds just as the first row.

At the first and second cell in the third row along the virtual scan, data scanned by the module of a bottom nearest neighbor is used. Each module's horizontal data source multiplexer 42 selects the data stream from its own memory. Then, each module's vertical data source multiplexer 44 selects the data stream from the vertical data source multiplexer 44 of its bottom nearest neighbor.

At the third and fourth cell in the third row along the virtual scan, data scanned by the module of a right nearest neighbor of a bottom nearest neighbor is used. Each module's horizontal data source multiplexer 42 selects the data stream from the horizontal data source multiplexer 42 of its right nearest neighbor. Then, each module's vertical data source multiplexer 44 selects the data stream from the vertical data source multiplexer 44 of its bottom nearest neighbor. The virtual scan of the fourth row proceeds just as the virtual scan of the third row.

To implement a cell space in three dimensions, three-dimensional modules are used. In the controller 27 within each module, a third data source multiplexer is used after the vertical data source multiplexer, with connections to the two nearest neighbors in the third dimension.

It is even possible to support a shallow fourth dimension, i.e., an additional dimension of finite extent: in a physically realizable machine only three dimensions can be indefinitely extended. As before, an additional data source multiplexer is connected in series with the other multiplexers.

Figure 4:
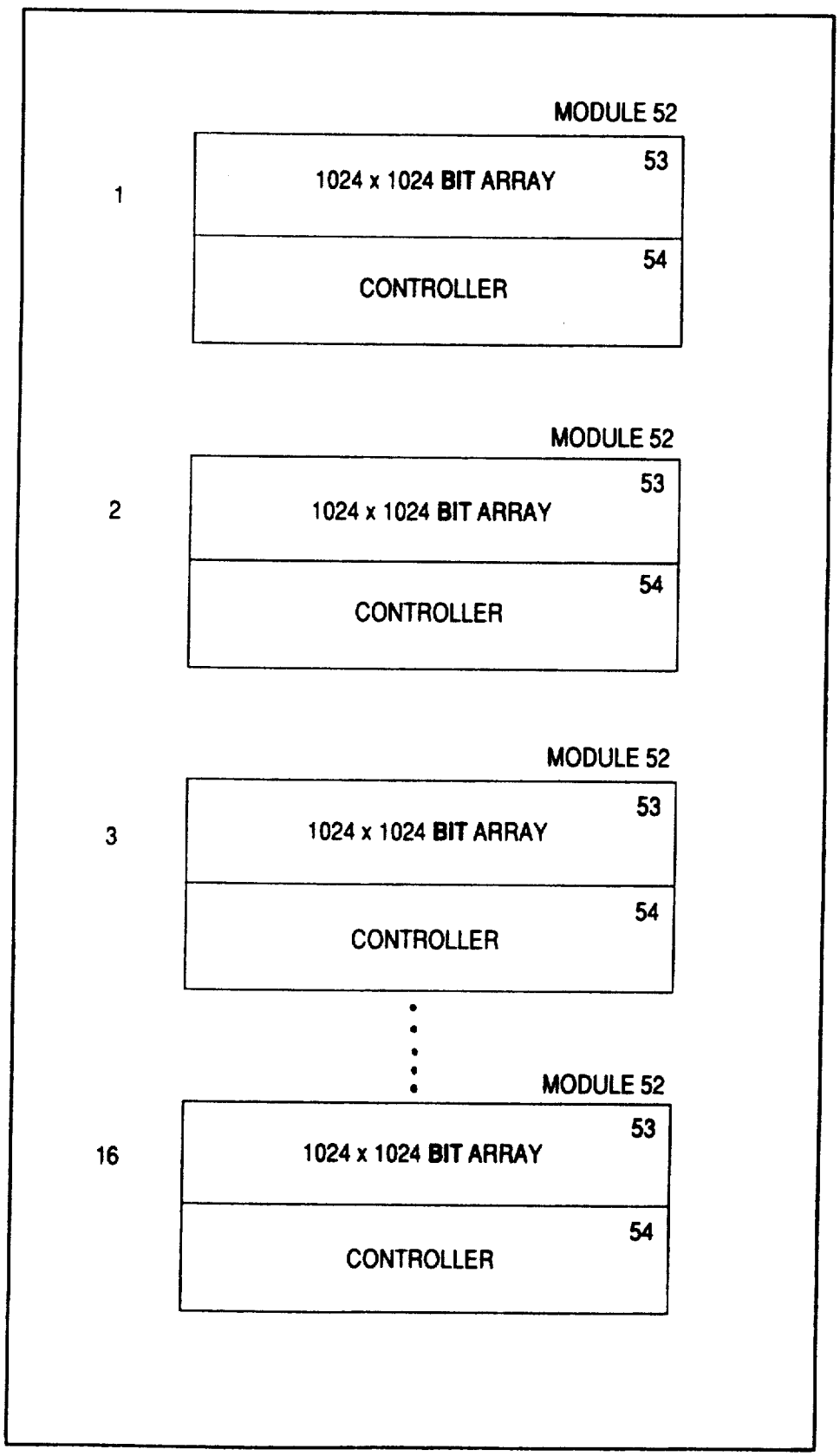
FIG. 4 is a block diagram of a space-module.
Figure 5A:
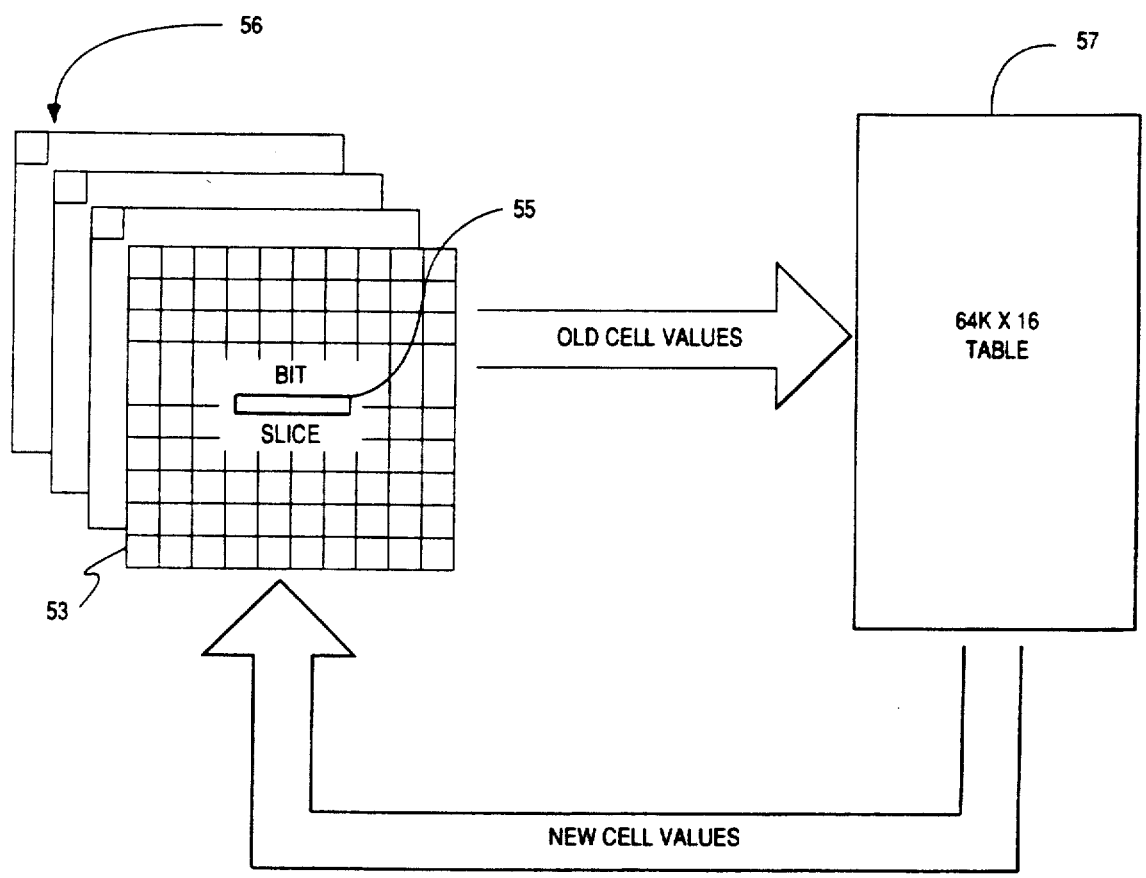
FIG. 5a is a representation of the sixteen-bit slices and the lookup table of a space module.

In the preferred embodiment of FIGS. 4 and 5a, a space-module 51 includes sixteen N-dimensional modules 52. Each module 52 includes an N dimensional array 53 of one million bits managed by a controller 54. The sixteen arrays 53 of bits together form an N-dimensional array of one million 16-bit data-cells called a space-module 51. Each of the bit-arrays 53 stores one of sixteen bit-slices 55 of cell data.

The basic operation of a space-module 51 is as follows: every 40 ns, the sixteen modules 52 present the value of a 16-bit cell 56 to the space-module's 64K × 16 lookup table 57. The lookup table 57 maps all possible input values into an equally large set of output values. The new cell values from the lookup table 57 are replaced in the sixteen bit arrays 53.

Each 16-bit cell is updated independently of other cells. Thus, the preferred embodiment may be viewed as a partitioning cellular automaton (PCA), where the sixteen bits form a "block" and the lookup table 57 implements a block update rule.

In the preferred embodiment, each processor is serially time shared among an array of one million 16-bit cells. The processors are actually large static-RAM lookup tables 57. The preferred embodiment can simulate a CA that assigns one processor to each cell, and thus inherits a CA's scalability and natural parallelism. In principle, the array can be organized in any number of dimensions, for example, as a 2D planar lattice or a 3D cubic lattice.

A bank of sixteen standard 1-megabit DRAM chips stores the cell data. Each 16-bit cell 56 is distributed over the sixteen DRAM chips, respectively. Corresponding bits, one from each cell, are taken together to form a bit-slice 55.

Cell memory is updated using a sequentially applied read-modify-write cycle. Each bit-array 53 is scanned independently, yielding a different virtual shift for each bit slice 55. As shown in FIG. 6, a unique virtual scan window 58 is associated with the virtual shift of each bit-slice 55.

For the first read-modify write cycle, the first cell in each of the sixteen virtual scan windows 58 is sent to the lookup table 57. The scan proceeds to a second cell in each of the sixteen virtual scan windows 58, executing a second read-modify-write cycle. This process repeats until all cells in each virtual scan window 58 have been scanned, whereupon the parameters of a new virtual shift can be adopted and a new scan can be started.

By controlling the virtual shifts of each bit-slice 55 we determine which sixteen bits will be presented as the first 16-bit cell to the lookup table 57. We call a module s ability to use virtual shifts in this manner "generality of neighborhood." If all the bit-slices 55 stored in the bit-arrays 53 experienced the same virtual shift, the 16-bit cells 56 would be presented to the lookup table 57 as isolated 16-bit systems.

Figure 5B:
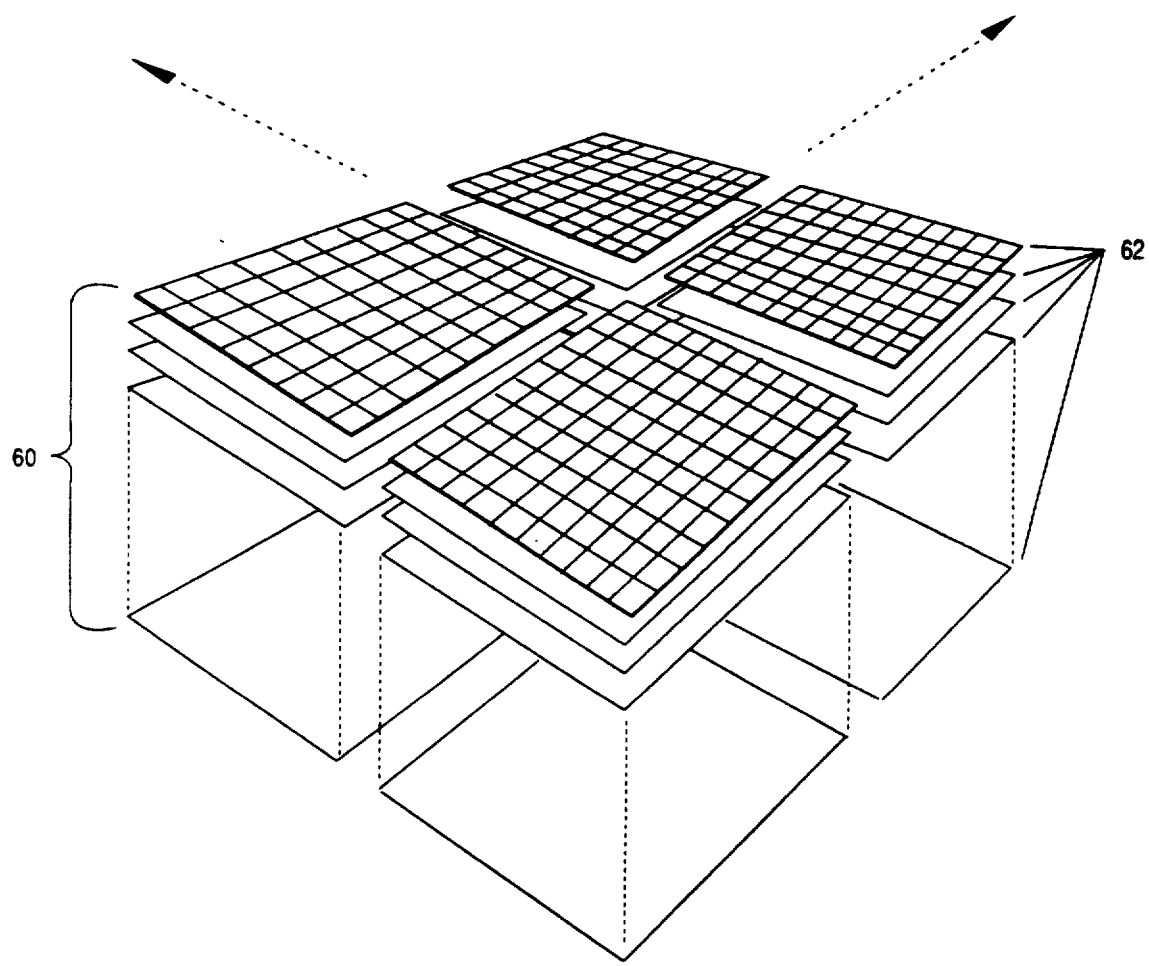
FIG. 5b is a representation of a three dimensional array of modules, each with sixteen bit slices.

Simulating a space larger than the space simulated by a single module requires a method of joining modules to form a continuous array of cells, without slowing down the individual modules. Referring to FIG. 5b, which illustrates a two dimensional example of an N-dimensional process, in a machine consisting of many modules, each with sixteen bit slices 62, each module 60 manages a subvolume within a larger space. Each of the sixteen (N-dimensional) bit-slices 62 is joined to the corresponding bit-slice of its nearest neighbors. When joined (glued), the individual bit-slices virtually shift as a unit. The 16-bit cells (one bit per bit slice) within each module s volume are presented one at a time to the processor belonging to the module. The results are then inserted into the cell-state memory of that module.

If glued bit-slices are to shift between modules, the modules must be physically connected. In the preferred embodiment, modules are interconnected to form a three dimensional lattice, so each module has six nearest neighbors. Each module is connected to each of its six neighbors with sixteen wires. Referring to FIG. 7, we illustrate the interconnection of modules in two dimensions. When a module 64 shifts a glued bit-slice, it gets the cell data it needs from its neighboring modules using the sixteen wires 66. By time-sharing the wires 66 that interconnect the modules 64, the number of wires needed is reduced by a factor of one million, as compared with a fully parallel architecture Each module has $2^{20}$, or about one million cells. Any of the sixteen bits within any of the $2^{20}$ cells of a given module can be shifted along any of three orthogonal directions into any other given cell within that module. Note that in both two and three dimensions, even with only nearest neighboring modules connected, some data from next-nearest neighbors will become available to a given module due to the operation of more than one level of multiplexing. For example, in two dimensions, bits from a first module situated immediately above and to the right of a second module may be shifted into the second module. The result is an effectively larger cell neighborhood. Thus, in a three dimensional configuration, each cell can communicate with a neighborhood of about eight million surrounding cells. The shifted bit can then be used with other shifted bits as the new cell data to be updated. Since bit-slices are shifted as a unit, all cells receive a similarly shifted bit. For example, if one cell gets a bit from 50 positions to the right, all cells do. Similarly, if the modules are arranged in a two dimensional configuration, then each cell can communicate with a neighborhood of about four million surrounding cells.

Hardware details

The preferred embodiment includes a number of modules, each assigned to simulate a volume within a larger simulation space. Referring to FIG. 7, each module 64 contains one million ($2^{20}$) 16-bit cells, a 64K×16 cell update lookup table 68, and various counters and registers (not shown) that are used for data analysis and error detection/correction. The flywheel input 70 and output 72 permit direct access to each module's scan, allowing external hardware to be attached to various points in the simulation space. The I/O bus 74 is used for communication with a host computer 76 that is responsible for initializing cell and table data, determining the size and shape of the cell space, and supervising shifting, display, analysis, and error handling.

Figure 8:
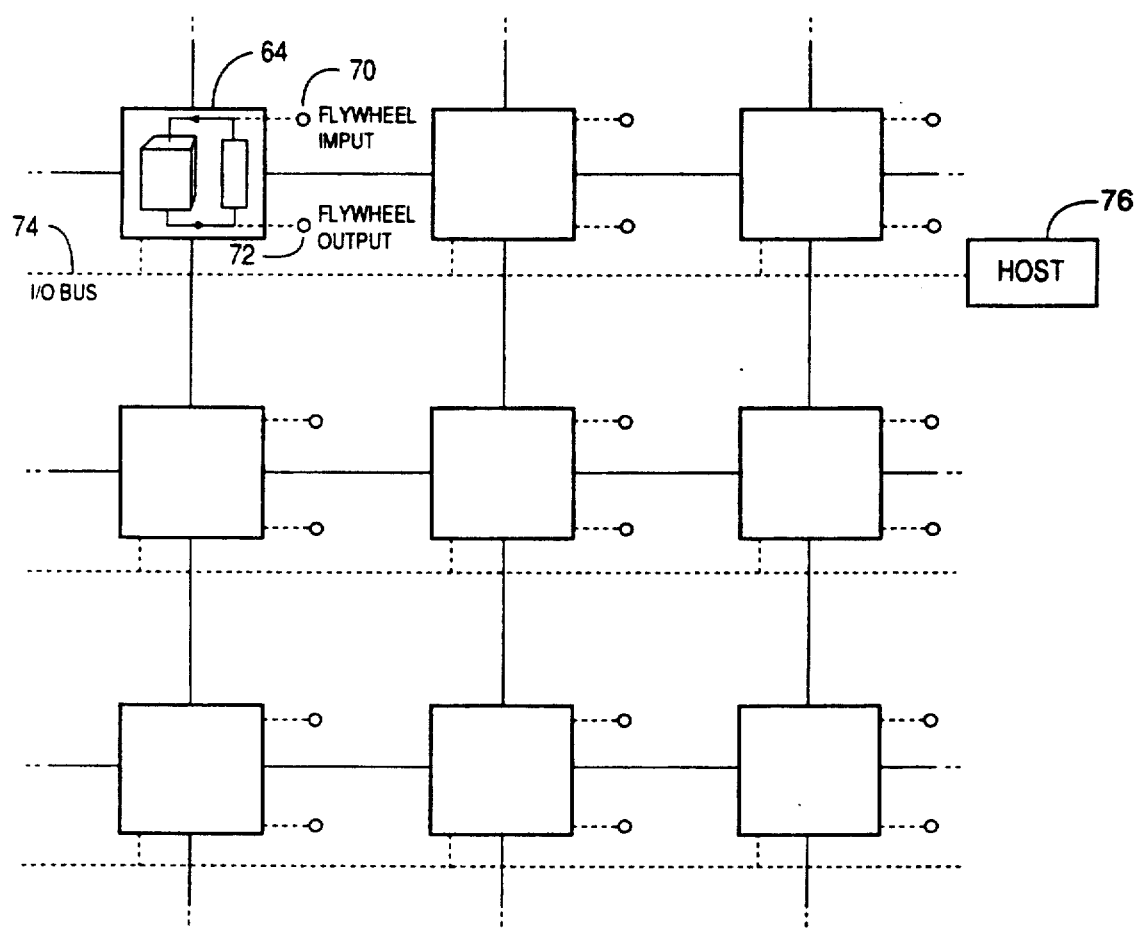
FIG. 8 is a representation of an interconnected array of modules.

Referring to FIG. 8, modules 64 are interconnected to have the topology of a two or three dimensional lattice. In three dimensions, each module has a nearest neighbor in each of six directions. The I/O bus 74 consists of several buses, each of which connects a fraction of the modules to the host 76. The flywheel bus 70 and 72 permits direct access to the time-multiplexed cell values scanned by each module.

Figure 9A:
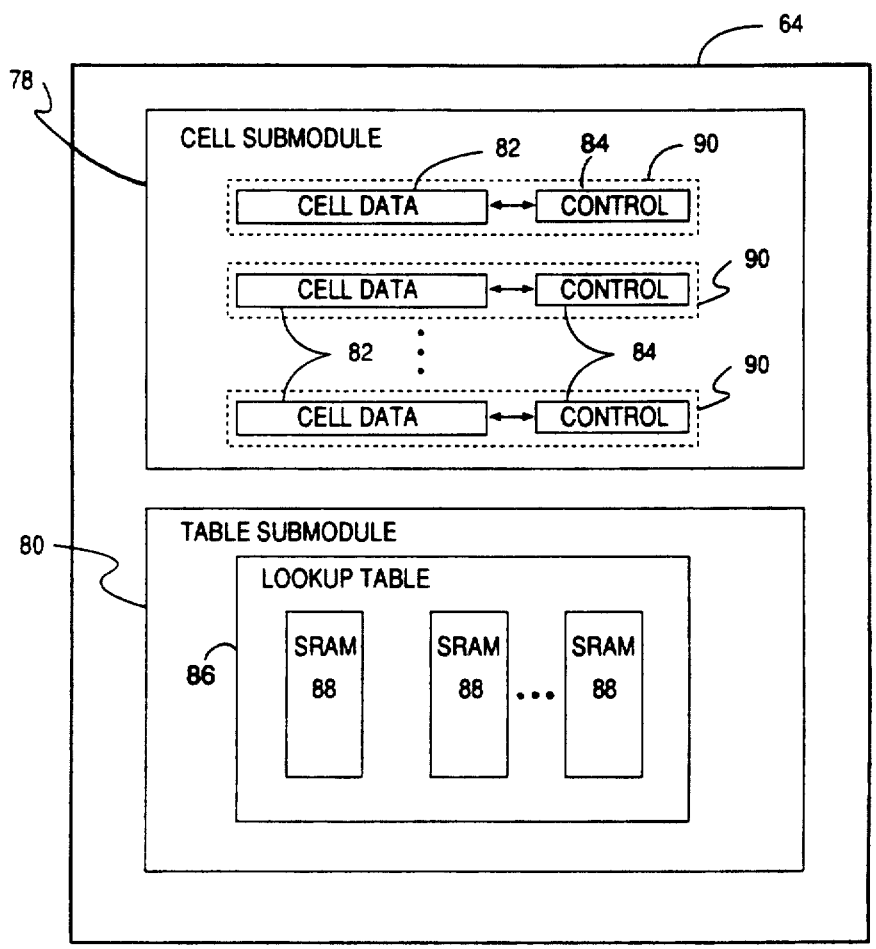
FIG. 9a is a block diagram of a module.
Figure 9B:
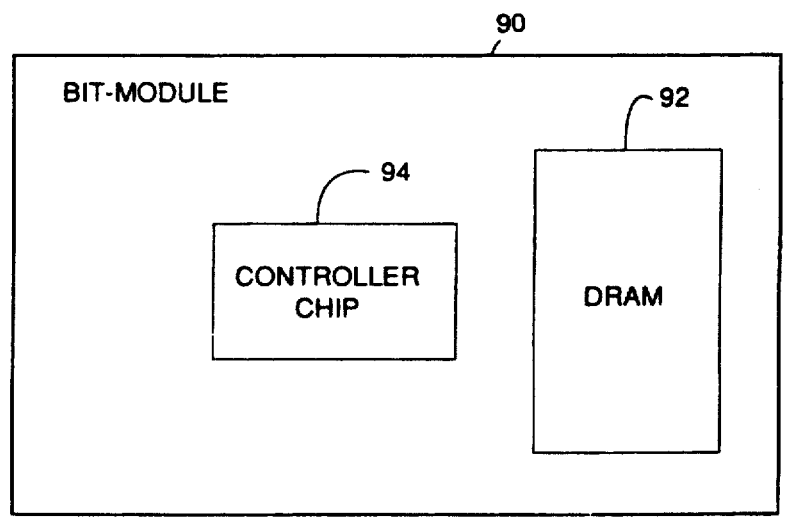

Referring to FIG. 9a, each module 64 consists of a cell submodule 78 and a table submodule 80 The cell submodule 78 contains cell data 82, along with some control and analysis circuitry 84. The table submodule 80 contains the lookup table 86, implemented using a 64K×16 SRAM (static random access memory) 88. Each cell submodule 78 consists of 16 bit-modules 90. Referring to FIG. 9b, each bit-module 90 controls a bit-slice of the cell data, where a bit-slice comprises one bit from each of the million cells in the module.

A bit-module 90 includes two chips: a 256K×4 DRAM (dynamic random access memory) 92, and a semicustom controller chip 94. Thus, given that there are 16 bit-slices, a cell submodule 78 consists of thirty-two chips. These chips, together with the SRAM 88 make up a complete module.

The controller chip

The main function of the controller chip 94 is to coordinate the cell scan pattern of the 16 bit-modules 90 by providing a sequence of cell addresses to its associated DRAM chip 92. The controller chip 94 also manages the data I/O of the DRAM 92 during cell updating by changing nibbles into a serial bitstream as the DRAM 92 is scanned, and grouping bits into nibbles in preparation for storing the updated cell bits back into the DRAM 92. The process of serializing and unserializing the bitstream, and the table lookup step, introduce a delay; thus the data written in a given nibble after updating will correspond to different cells than the nibble's previous contents. To compensate for this, the virtual shift applied to each bit-slice is adjusted. Using a read modify-write cycle, the updated cell data is written to the same storage location that was read from to save address setup time on the DRAM 92. The longest dimension of the space will be the first scanned along and is associated with a portion of a single memory row, to permit efficient use of DRAMs with static column mode. The use of nibble wide DRAMs compels the use of up to three bits of extra pipelining inside the controller chip to permit shifts along the longest dimension that are not a multiple of four.

The host bus

A host computer 76, such as a conventional serial computer, controls scanning order and multiplexing, for example. By talking over a bus to the controller chips, the host configures the system, initializes cells and tables, shifts bit-slices between updating steps, and reads various counters to analyze cell data and detect errors.

The flywheel bus

Referring to FIG. 7, the connections to the lookup table 68 may be broken, and the glued output 72 may be made directly available to external circuitry 73 (used to perform data analyses, for example), while the cell-bit input may be taken from an external source. The flywheel output 72 is so termed because the entire cell space of a given bit-module is made visible one cell at a time at the flywheel output as the cell data is scanned. Thus, the data may be viewed as sitting on a revolving data flywheel All the bits in a bit-module can be accessed using this output line In a 1024 processor machine, this bus is 16K bits wide. Similarly, there are 16K flywheel input lines available for writing to selected cell bits. The controller determines whether flywheel inputs or outputs are used.

The flywheel bus 70, 72 is distributed throughout the machine; there is no single large connector brought out of the machine. For example, display data is taken directly off this bus. Special purpose measurement and analysis equipment can be attached to particular chosen modules, just as measurement equipment is placed to capture data in a physical experiment. Similarly, external equipment can control localized input processes, for example, simulating smoke particle sources in a wind tunnel simulation.

Doubling the connections

In the embodiment of FIG. 7, six groups of sixteen wires link each module to its nearest neighbors in each of six directions (only four directions are shown in FIG. 7). The invention also includes a second group of sixteen wires that link each module to its second nearest neighbor in each of these same six directions. The second group of connections is used to divide the lattice of modules into sublattices. For example, substituting second nearest neighbor connections for nearest neighbor connections along one dimension splits the machine into two halves. Splitting the machine along the remaining two dimensions divides the machine into eighths.

For a CAM with a large number of modules, it is useful to split the machine into two equivalent sublattices of modules. Both sublattices perform the same computation, each continuously checking the other. The nearest neighbor wires along the direction of the second nearest neighbor wires are available for passing monitoring information between the two sublattices.

Splitting the machine in this manner also allows the use of a given cell bit by two modules, a feature not supported by the nearest neighbor shifting mechanism. The nearest neighbor wires connect the two sublattices, allowing one cell in a first lattice to contain a duplicate of the information contained in a corresponding cell in a second lattice. Such duplication is useful when one half of the machine is used to analyze what is happening in the other half while it is running, or when a cell updating is performed that requires double buffering. For example, to simulate a $3 \times 3$ two-dimensional neighborhood with one bit per cell, we could run the machine as two $32K \times 16K$ arrays of cells, and treat the sixteen bits in each cell as a $4 \times 4$ region of a bit-plane. Half the machine holds the old data while new data is constructed in the other half using several steps that shift around the $4 \times 4$ window and update the four center elements after each shift. This allows running a lattice of eight billion 1-bit cells.

Splitting the machine is also useful for implementing rules that need more than sixteen bits of input. Since pairs of cells are connected, a bit from either cell can be used by both. Some cell bits within each coupled pair can store intermediate values which are necessary for running an update which involves the repeated application of a sequence of look-up tables.

A further benefit of second nearest neighbor connections is that the width of the neighborhood along each direction which is not split is doubled relative to the width available using only the nearest neighbor connections.

Finally, a $2 \times 2 \times 2$ arrangement of eight modules will constitute a super module. In a machine using super modules constructed so that they are never split between circuit boards, all the nearest neighbor connections can be replaced within each super module with pairs of wires without increasing the number of wires going between boards. This more general interconnection between halves would provide additional flexibility in applications relying on a strong coupling between corresponding cells.

Additional Features

It should now be appreciated that the maximum size of a cell array which can be processed within practice of the present invention is not bounded by the architecture, which is indefinitely scalable.

In the architecture of the present invention, the cells of a given module may be scanned in any chosen order. This freedom may be taken advantage of for display and analysis purposes. For example, if the modules are scanned in an appropriate order, with appropriate timing, a real-time color display may be connected directly to flywheel outputs without video buffering. While our discussion thus far has been oriented specifically towards an implementation in terms of conventional memory chips, by abandoning this approach and by sacrificing some flexibility we can achieve much greater performance.

If we were to limit ourselves to rather simple processors, able to simulate only a small variety of rules (e.g., a small set of lattice gas rules), then we could put a large number on a single chip. For example, if we put 1024 processors on our chip, each servicing 64 8-bit cells using the scanning/shifting/gluing techniques discussed above and running with a 5 ns clock, then each chip would perform 200 billion cell updates per second. Clearly a variety of intermediate architectures is possible. depending upon the neighborhood required and the dimensionality that we wish to simulate. For practical technological reasons, the physical interconnection between chips, at least at present, would be limited to connecting the edges of two-dimensional arrays of a few thousand processors (a few hundred pins). Additional dimensions would have to be internal ones, achieved by the way in which individual processors scan the cell memory with which they are associated.

The present invention makes provision for attaching external circuitry to the cell-modules, to replace the lookup tables—in this case, additional stages to the data serializing/deserializing pipelines may be added, to allow the computation delay for such circuitry to be several bit-times longer than a lookup table (though such circuitry must finish a computation each bit time, this may have been a multistage pipelined computation). There is no reason in principal why very long pipelines, involving perhaps hundreds or thousands of stages, could not be used, since the computation performed by each module is completely sequential, and the data access is perfectly predictable.

Our decision to use 16-bit cells in our preferred embodiment was arrived at by determining that a 16-bit address was about the most we could handle by fast table lookup. If we abandon table lookup and use other kinds of processors, cells could in some cases be much larger. For example, each cell might contain several 80 bit floating point numbers, and these numbers could be virtually shifted just as we handle the bit-slices described above (since all bits in each number would shift together, we have a lot of flexibility in deciding how, or even whether, to divide the bits up between memory chips). Pipelining would allow us to use commercial floating point chips to do the desired calculations Similarly, various compositions of moderately sized lookup tables, appropriately pipelined, could be used to handle the updating of large cells in many cases of interest.

Other embodiments are within the following claims.
What is claimed is:

1. A method for performing computations organized as a process occurring in a multidimensional space, the method being performed on a digital processing system, the computer implemented method comprising the steps of:
   (a) assigning a cell to each of many locations in the multidimensional space;
   (b) providing each cell with a set of data elements;
   (c) providing a plurality of memory components, and storing corresponding data elements from each cell in the same memory component;
   (d) repeatedly updating the cells at regular time intervals, the updating being performed using fewer processors than cells by sequentially updating one cell after another, the updating steps comprising:
      (1) separately permuting the elements within each memory component, said permuting being different for at least some different components,
      (2) after the permuting, accessing the new data elements corresponding to each cell, one from each said memory component, and applying predetermined transformation rules to the new set of data elements associated with the cell.

2. The method of claim 1 wherein the permuting comprises a virtual movement performed by varying the addressing.

3. The method of claim 2 wherein the virtual movement comprises a virtual shift performed by varying an address pointer.

4. The method of claim 1 wherein the memory components each comprise one or more discrete memory chips.

5. The method of claim 1 wherein cells are grouped into modules, with each module representing a portion of the physical space being modeled, and wherein each module comprises the plurality of memory components with corresponding data elements stored in the same component, and wherein updating is synchronized across modules.

6. The method of claim 5 wherein there is at least one processor associated with each module.

7. The method of claim 6 wherein permuting is performed across module boundaries by passing the contents of individual data elements between neighboring modules at or just prior to the time that the contents are needed in the rule applying step.

8. The method of claim 7 wherein the step of applying rules is performed using a look-up table, by bringing the shifted set of data elements to the look-up table and returning the output of the look-up table.

9. The method of claim 1
   wherein the memory components each comprise one or more discrete memory chips,
   wherein the permuting comprises a virtual shift performed by varying an address pointer,
   wherein cells are grouped into modules, with each module representing a portion of the physical space being modeled, and wherein each module comprises the plurality of memory components with corresponding data elements stored in the same component, and wherein updating is synchronized across modules, and
   wherein there is at least one processor associated with each module,
   wherein shifting is performed across module boundaries by passing the contents of individual data elements between neighboring modules at or just prior to the time that the contents are needed in the rule applying step.

10. An apparatus for performing computations organized as a process occurring in a multidimensional space, wherein a cell is assigned to each of many locations in the multidimensional space, and wherein each said cell includes a set of data elements, said apparatus comprising:
   memory components for storing the contents of the cells, wherein corresponding data elements from each cell are stored in the same memory component;
   updating circuitry for updating the cells at regular time intervals, the updating being performed using fewer processors than cells by sequentially updating one cell after another, by
      separately permuting the elements within each memory component, said permuting being different for at least some different components, and
      accessing permuted data elements corresponding to each cell, one from each said memory component, and applying predetermined transformation rules to the new set of data elements associated with the cell.

11. The apparatus of claim 10 wherein the permuting comprises a virtual movement performed by varying the addressing.

12. The apparatus of claim 11 wherein the virtual movement comprises a virtual shift performed by varying an address pointer.

13. The apparatus of claim 10 wherein the memory components each comprise one or more discrete memory chips.

14. The apparatus of claim 10 wherein cells are grouped into modules, with each module representing a portion of the physical space being modeled, and wherein each module comprises the plurality of memory components with corresponding data elements stored in the same component, and wherein updating is synchronized across modules.

15. The apparatus of claim 14 wherein there is at least one processor associated with each module.

16. The apparatus of claim 15 wherein permuting is performed across module boundaries by passing the contents of individual data elements between neighboring modules at or just prior to the time that the contents are needed in the rule applying step.

17. The apparatus of claim 16 wherein applying the transformation rules is performed using a look-up table, by bringing the shifted set of data elements to the look-up table and returning the output of the look-up table.

18. The apparatus of claim 10
wherein the memory components each comprise one or more discrete memory chips,
wherein the permuting comprises a virtual shift performed by varying an address pointer,
wherein cells are grouped into modules, with each module representing a portion of the physical space being modeled, and wherein each module comprises the plurality of memory components with corresponding data elements stored in the same component, and wherein updating is synchronized across modules, and
wherein there is at least one processor associated with each module,
wherein shifting is performed across module boundaries by passing the contents of individual data elements between neighboring modules at or just prior to the time that the contents are needed in the rule applying step.

19. The apparatus of claim 10 further comprising circuitry for sequentially providing the contents of each cell to external circuitry as the cells are updated (i.e., as the predetermined rules are applied to the memory elements).

20. The apparatus of claim 19 wherein the order and timing with which cells are updated is the same as that required by said external circuitry.

21. The apparatus of claim 20 wherein said external circuitry performs data reduction by combining the results of functions computed successively on cells as the updating proceeds.

22. The apparatus of claim 20 wherein the update follows a raster order corresponding to that used by display circuitry that displays the contents of the cells.

23. The apparatus of claims 10 further comprising circuitry for providing external data to the rule applying circuitry.

24. The apparatus of claim 23 wherein the order and timing with which cells are updated is the same as that required by said circuitry for providing external data.

25. The apparatus of claim 10 wherein the circuitry for applying the predetermined transformation rules comprises a multi-stage pipeline.

26. The apparatus of claim 10 wherein said memory components comprise memories that are more efficiently accessed on some particular pattern, and wherein the order in which cells are updated is such that memory accesses are primarily in that more efficient pattern.

27. The apparatus of claim 26 wherein said memories are nibble-wide DRAMs and wherein the apparatus further comprises pipeline circuitry for accepting nibbles from the DRAMs while supplying individual bits to the circuitry applying the transformation rules.

* * * * *

UNITED STATES PATENT AND TRADEMARK OFFICE
CERTIFICATE OF CORRECTION

PATENT NO. : 5,159,690

DATED : October 27, 1992

INVENTOR(S) : Norman H. Margolus

It is certified that error appears in the above-identified patent and that said Letters Patent is hereby corrected as shown below:

The title page should be deleted to appear as per attached title page.

United States Patent [19]
Margolus

[11] Patent Number: 5,159,690
[45] Date of Patent: Oct. 27, 1992

[54] MULTIDIMENSIONAL CELLULAR DATA ARRAY PROCESSING SYSTEM WHICH SEPARATELY PERMUTES STORED DATA ELEMENTS AND APPLIES TRANSFORMATION RULES TO PERMUTED ELEMENTS

[75] Inventors: Norman H. Margolus, Somerville; Mass.

[73] Assignee: Massachusetts Institute of Technology, Cambridge, Mass.

[21] Appl. No.: 252,391

[22] Filed: Sep. 30, 1988

[51] Int. Cl.$^5$ .............................................. G06F 15/31
[52] U.S. Cl. ................................... 395/800; 364/259.8; 364/221.2; 364/232.3; 364/256.4; 364/DIG. 1
[58] Field of Search ... 364/200 MS File, 900 MS File; 395/800

[56] References Cited

U.S. PATENT DOCUMENTS

| | | | |
|---|---|---|---|
| 4,380,046 | 4/1983 | Fung | 364/200 |
| 4,449,201 | 5/1984 | Clark | 364/900 |
| 4,513,374 | 4/1985 | Hooks | 364/200 |
| 4,601,055 | 7/1986 | Kent | 364/900 |
| 4,602,347 | 7/1986 | Koyama | 364/200 |
| 4,707,859 | 11/1987 | Nudd | 382/50 |
| 4,769,644 | 9/1988 | Frazier | 382/50 |
| 4,769,664 | 9/1988 | Frazier | 382/50 |
| 4,773,038 | 9/1988 | Hillis | 364/900 |
| 4,805,091 | 2/1989 | Thiel | 364/200 |
| 4,805,228 | 2/1989 | Jenkins | 382/49 |
| 4,809,202 | 2/1989 | Wolfram | 364/200 |
| 4,814,973 | 3/1989 | Hillis | 364/200 |
| 4,827,432 | 5/1989 | Kasano | 382/41 |
| 4,831,519 | 5/1989 | Morton | 364/200 |
| 4,858,110 | 8/1989 | Miyata | 364/200 |
| 4,860,236 | 8/1989 | McLeod | 364/717 |
| 4,860,248 | 8/1989 | Lumelsky | 364/900 |
| 4,862,347 | 8/1989 | Rudy | 364/200 |
| 4,882,683 | 11/1989 | Rupp | 340/723 |
| 4,905,143 | 2/1990 | Takahashi | 364/200 |
| 4,983,958 | 1/1991 | Carrlick | 364/200 |

OTHER PUBLICATIONS

Toffoli, Tommaso et al., "Programmable Matter: Concepts and Realization" Jan. 31, 1990, pp. 1-10, to appear in *Physica D* 666 (1990) 1-O, North Holland, Amsterdam.

Margolus, Norman et al., "Cellular-Automata Supercomputers for Fluid-Dynamics Modeling" *Physical Review Letters*. vol. 56:16, pp. 1694-1696, Apr. 21, 1986.

Toffoli, Tommaso, "Cellular Automata as an Alternative to (Rather Than an Approximation of) *Differential Equations in Modeling Physics*" Physica 10D pp. 117-127, (1984).

Toffoli, T. and Margolus, N., "A New Environment for Modeling", Cellular Automata Machines (1987), pp. 165-167 and pp. 243-247.

Toffoli, T. and Margolus, N., "The CAM-7 Multiprocessor: A Cellular Automata Machine", Laboratory for Computer Science (1985).

Toffoli, T. and Margolus, N., "Cellular Automata Machines", *Complex Systems*, vol. 1, No. 5 (1987), pp. 967-993.

(List continued on next page.)

*Primary Examiner*—Thomas C. Lee
*Assistant Examiner*—Eric Coleman
*Attorney, Agent, or Firm*—Fish & Richardson

[57] ABSTRACT

A method for coordinating the activity of a plurality of processors in a computing architecture adapted to emulate a physical space, in which spatial locality is reflected in memory organization, including the steps of subdividing the emulated physical space, assigning memory to each subdivision, and assigning a processor to each assigned memory, respectively. A related data array computer for performing an iterative updating operation upon data bits, including a first circuit for performing data-blind data movement upon the data bits, the circuit being scalable, and a second circuit for performing an arbitrary update function upon at least some of the data bits. The architecture is adapted to readily implement cellular automata.

27 Claims, 9 Drawing Sheets

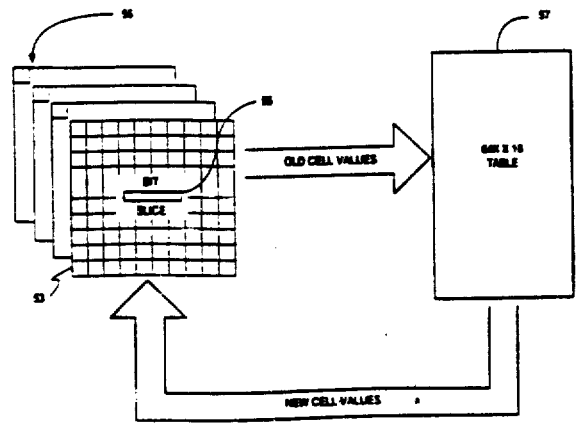

UNITED STATES PATENT AND TRADEMARK OFFICE
CERTIFICATE OF CORRECTION

PATENT NO. : 5,159,690

DATED : October 27, 1992

INVENTOR(S) : Norman H. Margolus

It is certified that error appears in the above-identified patent and that said Letters Patent is hereby corrected as shown below:

Title Page:

Under [75] Inventors: The name "Tommaso Toffoli" should be deleted.

Under [56] References Cited, U.S. PATENT DOCUMENTS: "4,806,248" should be --4,860,248--.

Column 2, line 37, "element" should be --elements--.

Column 3, line 54, "data cells" should be --data-cells--.

Column 3, line 60, after "numbers", insert --.--.

Column 3, line 68, after "t", insert --.--.

Column 4, line 48, "bit slices" should be --bit-slices--.

Column 5, line 58, after "cells", insert --.--.

Column 6, line 20, after "module", insert --.--.

Column 6, line 31, "multiplexinq" should be --multiplexing--.

Column 6, line 41, "read modify write" should be --read-modify-write--.

Column 6, line 44, "module s" should be --module's--.

UNITED STATES PATENT AND TRADEMARK OFFICE
CERTIFICATE OF CORRECTION

PATENT NO. : 5,159,690

DATED : October 27, 1992

INVENTOR(S) : Norman H. Margolus

It is certified that error appears in the above-identified patent and that said Letters Patent is hereby corrected as shown below:

Column 7, line 41, "single bit" should be --single-bit--.

Column 8, line 68, "time shared" should be --time-shared--.

Column 9, line 16, "bit slice" should be --bit-slice--.

Column 9, line 19, "modify write" should be --modify-write--.

Column 9, line 29, "module" should be --module's--.

Column 9, line 30, delete "s" before "ability".

Column 9, line 46, "bit slice" should be --bit-slice--.

Column 9, line 47, "module s" should be --module's--.

Column 9, line 62, after "architecture", insert --.--.

Column 11, line 12, "nibble wide" should be --nibble-wide--.

Column 11, line 36, after "line", insert --.--

UNITED STATES PATENT AND TRADEMARK OFFICE
CERTIFICATE OF CORRECTION

PATENT NO.  : 5,159,690

DATED       : October 27, 1992

INVENTOR(S) : Norman H. Margolus

It is certified that error appears in the above-identified patent and that said Letters Patent is hereby corrected as shown below:

Column 13, line 60, "alter" should be --after--.

Signed and Sealed this

Twelfth Day of January, 1993

Attest:

DOUGLAS B. COMER

Attesting Officer

Acting Commissioner of Patents and Trademarks